United States Patent
Chan et al.

(10) Patent No.: US 10,535,069 B2
(45) Date of Patent: Jan. 14, 2020

(54) METHOD, MEDIUM, AND SYSTEM FOR HANDLING BLOCKS ON ORDERS DURING ORDER PROCESSING

(75) Inventors: Yumman Chan, Rexdale (CA); Lev Mirlas, Thornhill (CA); Viswanath Srikanth, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 26 days.

(21) Appl. No.: 13/162,369

(22) Filed: Jun. 16, 2011

(65) Prior Publication Data
US 2011/0246319 A1    Oct. 6, 2011

Related U.S. Application Data

(63) Continuation of application No. 11/342,383, filed on Jan. 27, 2006, now Pat. No. 7,996,271.

(51) Int. Cl.
*G06Q 30/00* (2012.01)
*G06Q 30/06* (2012.01)

(52) U.S. Cl.
CPC ......... *G06Q 30/00* (2013.01); *G06Q 30/0601* (2013.01); *G06Q 30/0635* (2013.01); *G06Q 30/0641* (2013.01)

(58) Field of Classification Search
CPC .......................... G06Q 30/0635; G06Q 30/00
USPC .............................................. 705/26.1, 26.81
See application file for complete search history.

(56) References Cited

U.S. PATENT DOCUMENTS

| | | | |
|---|---|---|---|
| 6,862,573 B2 | 3/2005 | Kendall et al. | |
| 7,177,825 B1 | 2/2007 | Borders et al. | |
| 7,392,207 B2 | 6/2008 | Petong | |
| 7,606,742 B2 | 10/2009 | Bright et al. | |
| 2002/0004777 A1 | 1/2002 | Foster et al. | |
| 2003/0065574 A1 | 4/2003 | Lawrence | |
| 2003/0233374 A1 | 12/2003 | Spinola et al. | |
| 2005/0144527 A1 | 6/2005 | Haas et al. | |
| 2005/0289013 A1* | 12/2005 | Goldberg | G06Q 10/06311 705/7.13 |
| 2007/0112664 A1 | 5/2007 | Zhang et al. | |
| 2007/0179859 A1 | 8/2007 | Chan et al. | |

OTHER PUBLICATIONS

"Escalate Order Management", http://www.escalate.com/colateral/order management.pdf , pp. 1-3 2005 (Year: 2005).*
"Escalate Order Management", http://www.escalate.com/colateral/order_management.pdf , pp. 1-3, 2005.
(Continued)

*Primary Examiner* — Matthew E Zimmerman
(74) *Attorney, Agent, or Firm* — William H. Hartwell

(57) ABSTRACT

A block for an order is received during processing of the order, wherein a reason for the block for the order is associated with the block for the order. A set of actions is identified based on the reason for the block for the order in response to receiving the block for the order. The set of actions is executed with respect to the order in response to identifying the set of actions based on the reason for the block for the order, wherein the set of actions comprises a stage at which processing for the order ceases, restarts, and executes recovery actions, as specified.

12 Claims, 9 Drawing Sheets

(56) References Cited

OTHER PUBLICATIONS

"GERS Multi-Channel Commerce", http://www.gers.com/solutions/multi_chan_order.html , pp. 1-2.
"Quixa Ultimus Workflow Suite Product Brief", *Ultimus Inc.* (*v5.0c*) Jul. 2002 , pp. 1-19.
"U.S. Appl. No. 11/342,383 Final Office Action", dated Aug. 2, 2010 , 9 pages.
"U.S. Appl. No. 11/342,383 Office Action", dated Feb. 24, 2010 , 12 pages.
BEA, , "BEA WebLogic Integration—Learning to Use BPM with WebLogic Integration", *Release 7.0, BEA Systems, Inc.* http://downloadllnw.oracle.com/docs/cd/E13214_01/wli/docs70/pdf/bpmtutor.pdf (Obtained from the Internet on Mar. 9, 2010) Jun. 2002 , pp. 1-212.
Dayal, Umeshwar et al., "Business Process Coordination: State of the Art, Trends, and Open Issues", *Proceedings of the 27th VLDB Conference,* Roma, Italy, Very Large Data Base Endowment http://eprints.kfupm.edu.sa/29016/1/29016.pdf (Obtained from the internet on Mar. 10, 2010) 2001 , pp. 1-11.
Grefen, Paul et al., "CrossFlow: Cross-Organizational Workflow Management in Dynamic Virtual Enterprises", *Comput Syst Sci & Eng* (2000) CRL Publishing Ltd., vol. 15, No. 5 http://citeseerx.ist.psu.edu/viewdoc/summary?doi=10.1.1.17.9613 (Obtained from the internet on Mar. 10, 2010) Sep. 2000 , pp. 277-290.

\* cited by examiner

| BLOCK REASON 500 | MAY NOT EXECUTE 502 | RE-EXECUTE 504 | RECOVERY ACTIONS 506 |
|---|---|---|---|
| 508 FRAUD | 510 AUTHORIZE PAYMENT<br>512 ALLOCATE INVENTORY 514<br>SEND RELEASE TO FULFILLMENT | AUTHORIZE PAYMENT | NONE 524 |
| 516 DENIED PARTY LIST | AUTHORIZE PAYMENT<br>ALLOCATE INVENTORY<br>SEND RELEASE TO FULFILLMENT | AUTHORIZE PAYMENT 518 | NONE 526 |
| EXCESSIVE PRICE OVERRIDE | SEND RELEASE TO FULFILLMENT | NONE | NONE |
| ORDER AMOUNT IS LARGE | SEND RELEASE TO FULFILLMENT | NONE | NONE |
| ORDER ITEM IS SENSITIVE | SEND RELEASE TO FULFILLMENT | NONE | NONE |
| FULFILLMENT CENTER HOLD | SEND RELEASE TO FULFILLMENT | NONE | NONE |
| INVENTORY CYCLE COUNT | ALLOCATE INVENTORY<br>SEND RELEASE TO FULFILLMENT | ALLOCATE INVENTORY | DE-ALLOCATE INVENTORY |

METHOD, MEDIUM, AND SYSTEM FOR HANDLING BLOCKS ON ORDERS DURING ORDER PROCESSING

FIELD OF THE INVENTION

The present inventive subject matter relates generally to an improved data processing system and in particular to a computer implemented method, apparatus, and computer program product for improving performance in a data processing system. Still more particularly, the present inventive subject matter provides a computer implemented method, apparatus, and computer program product for blocking orders during order processing.

DESCRIPTION OF THE RELATED ART

Electronic commerce (e-commerce) is the conducting of business communication and transactions over networks. E-commerce includes the buying and selling of goods and services, and the transfer of funds, through digital communications. E-commerce also includes inter-company and intra-company functions that enable commerce and use electronic mail, electronic data interchange, file transfer, fax, video conferencing, workflow, or interaction with a remote computer. Further, e-commerce includes other mechanisms for doing business over a network, such as buying and selling over the Internet, electronic funds transfer, and digital cash.

An e-commerce order processing system is a system responsible for handling an order submitted through e-commerce. An order is a commercial document providing specifications and quantities used to request a seller to supply something in return for payment. Order processing is a series of stages that typically begins with a customer submitting an order and typically ends with fulfillment of the order to the customer. A block for an order is a mechanism used in an order processing system to temporarily stop or suspend the processing of an order submitted by a customer. An e-commerce order processing system may set a block for an order for many possible reasons. A reason for a block for an order specifies why the block exists for the order.

An e-commerce order processing system may set a block for an order automatically or in response to a manual request made by an authorized administrator. Similarly, an e-commerce order processing system may resolve a block for an order automatically or in response to a manual request made by an authorized administrator. The effect of a block for an order is that either all order processing is suspended immediately for the order, or all order processing is suspended once the order processing reaches a pre-defined stage in the order processing for the order. A block for an order is resolved when the reason for blocking the order no longer exists, such that the block for the order is no longer enforced. At any given time, an order may be blocked for multiple reasons, in which case all the reasons must be resolved before the order processing is resumed.

One problem that many e-commerce processing systems encounter in blocking orders occurs when the blocked orders clog the e-commerce order processing system. Often these clogs of blocked orders occur at stages in the order processing that bear no relation to the reason for the block for the order. In many situations, even when an order is blocked, no need exists to stop the order processing. For example, an e-commerce order processing system may set a block for all orders at a given fulfillment center because the shipping bay at the fulfillment center is inoperative due to a malfunction. In this situation, there is no reason to prevent order processing from continuing all the way through inventory allocation, and perhaps even through picking and packing. However, traditional e-commerce order processing systems set blocks for orders that hold the orders, either at the stage in order processing at which the block is set, or at some pre-defined stage in the order processing. The processing for an order ceases, or holds, when a block for the order stops the execution of an order processing stage for the order. A shipping bay malfunction hold on the order processing may result in no picking or packing for any order even though picking and packing may be processed for any order. Another problem exists for traditional e-commerce order processing systems that use a pre-defined stage in the order processing for blocking an order. If an order is already past the pre-defined stage in the order processing for blocking an order, the order cannot be blocked at all.

Traditional e-commerce order processing systems deal with these and other problems in a variety of ways. Personnel manually interpret order blocks, using instructions regarding when to ignore blocks for orders and when to apply blocks for orders. This manual interpretation method applies only to a manual interpretation e-commerce order processing system, which is highly inefficient. An alternative to manual interpretation is the modification of the software in a traditional e-commerce order processing system to create a block at an appropriate stage in the order processing, a stage beyond which the order processing cannot proceed. However, the software modification method has several disadvantages.

Modifications to the software in a traditional e-commerce order processing system make the resulting software very complex, as the blocking logic is spread throughout the software. Therefore, software modification requires the blocking logic to be aware of order processing. This requirement reduces software modularity and increases connascence between order processing modules and order blocking modules. Connascence occurs between order processing modules and order blocking modules when a modification in one order processing module may require a modification in the corresponding order blocking module to preserve overall correctness, or when a modification in one order blocking module may require a modification in the corresponding order processing module to preserve overall correctness. Furthermore, connascence occurs between order processing modules and order blocking modules when a modification to software in a traditional e-commerce order processing system may require modification to both an order processing module and a corresponding order blocking module together in order to preserve overall correctness. Therefore, modifications to the software in a traditional e-commerce order processing system make the resulting software both difficult to enhance and difficult to maintain.

Additionally, modifications to the software in a traditional e-commerce order processing system do not offer any level of configurability. For example, if a seller decides to change the rules for what happens when a traditional e-commerce order processing system sets a block for an order, further modifications are difficult to implement. Therefore, neither the manual interpretation method nor the software modification method is very effective.

BRIEF SUMMARY OF THE INVENTION

Embodiments of the present inventive subject matter provide a computer implemented method, a data processing system, and computer program product for blocking orders during order processing. A computer implemented method receives a block for an order during processing of the order. A reason for the block for the order is determined. Data that indicates a plurality of reasons for blocking an order and a plurality of actions are accessed. The data specify a set of one or more actions of the plurality of actions to take for each of the plurality of reasons for blocking an order. The plurality of reasons for blocking an order comprises the reason for the block for the order. The set of one or more actions specified for the reason for the block for the order is selected. Processing for the order at a first of a plurality of stages of the order processing as specified by the set of one or more actions is ceased. Processing for the order is resumed after the block is resolved.

BRIEF DESCRIPTION OF THE SEVERAL VIEWS OF THE DRAWINGS

The novel features believed characteristic of the inventive subject matter are set forth in the appended claims. The inventive subject matter itself, however, as well as a preferred mode of use, further objectives and advantages thereof, will best be understood by reference to the following detailed description of an illustrative embodiment when read in conjunction with the accompanying drawings, wherein:

FIG. 5 is an example of a block reason information table.

DETAILED DESCRIPTION OF THE INVENTION

Figure 1:
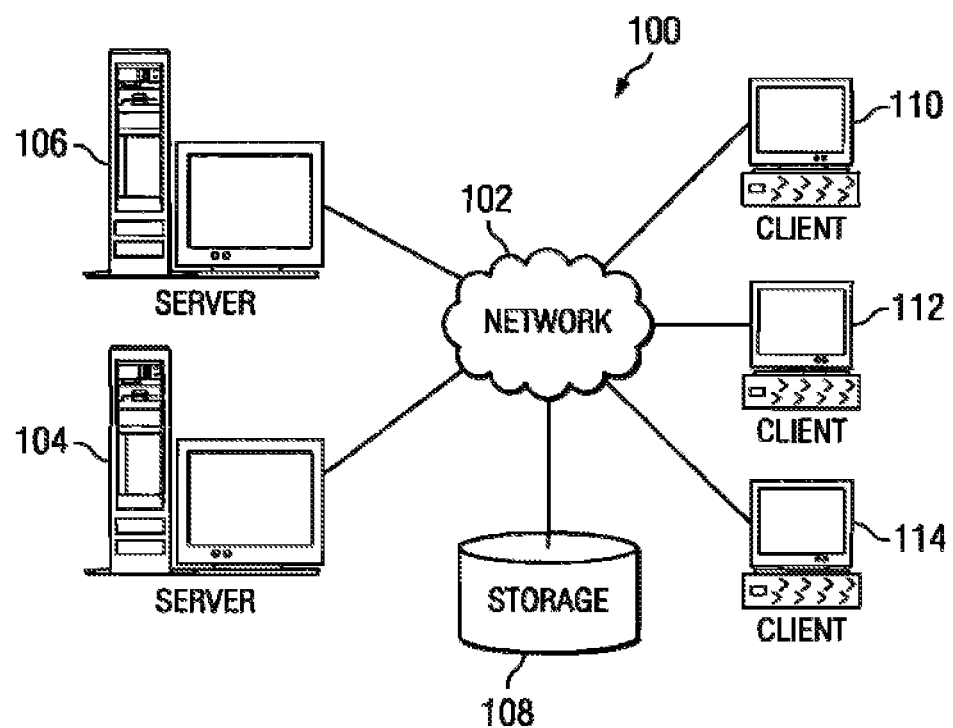
FIG. 1 is a pictorial representation of a data processing system for handling blocks on orders during order processing.

As will be appreciated by one of skill in the art, the present inventive subject matter may be embodied as a method, system, or computer program product. Accordingly, the present inventive subject matter may take the form of an entirely hardware embodiment, an entirely software embodiment (including firmware, resident software, micro-code, etc.) or an embodiment combining software and hardware aspects all generally referred to herein as a "circuit" or "module." Furthermore, the present inventive subject matter may take the form of a computer program product on a computer-usable storage medium having computer-usable program code embodied in the medium.

Any suitable computer useable or readable medium may be utilized. The computer-usable or computer readable medium may be, for example but not limited to, an electronic, magnetic, optical, electromagnetic, infrared, or semiconductor system, apparatus, device, or propagation medium. More specific examples (a nonexhaustive list) of a computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. More specific examples of a computer readable propagation medium include an electrical connection having one or more wires, an optical fiber, a transmission media such as those supporting the Internet or an intranet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present inventive subject matter may be written in an object oriented programming language such as Java7, Smalltalk or C++. However, the computer program code for carrying out operations of the present inventive subject matter may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present inventive subject matter is described below with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 2:
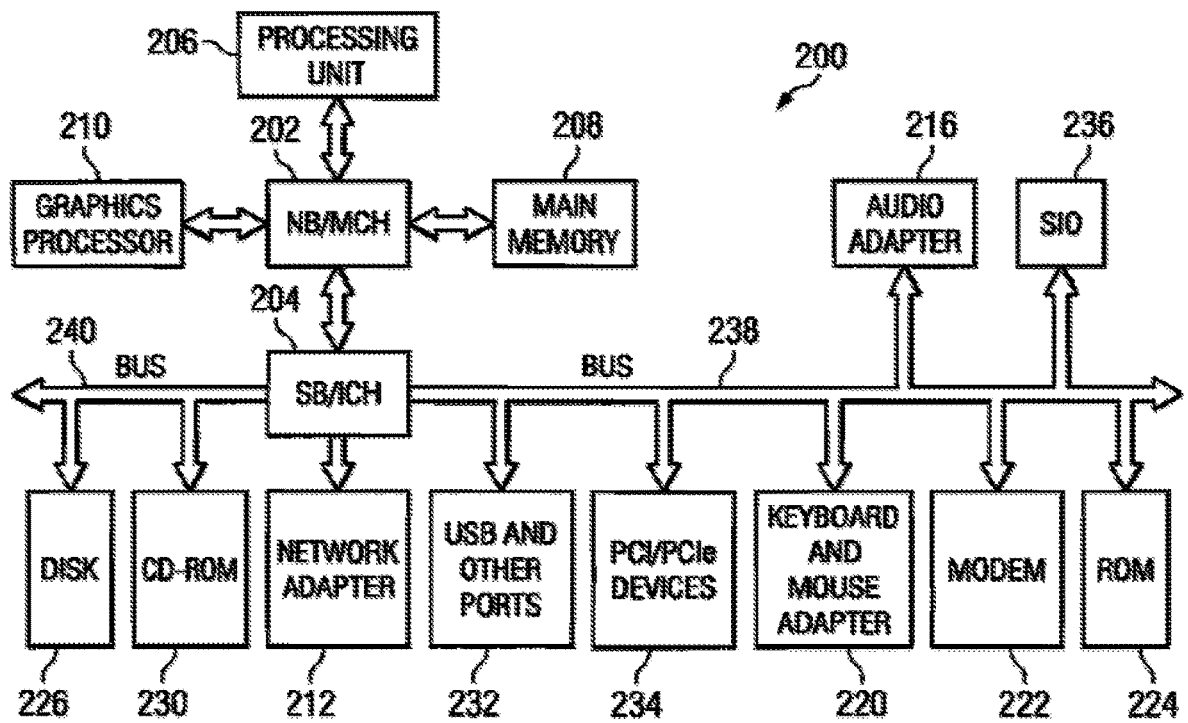
FIG. 2 is a block diagram of a data processing system that may be implemented as a server for handling blocks on orders during order processing.

FIGS. 1-2 are provided as exemplary diagrams of data processing environments in which embodiments of the present inventive subject matter may be implemented. It should be appreciated that FIGS. 1-2 are only exemplary and are not intended to assert or imply any limitation with regard to the environments in which aspects or embodiments of the present inventive subject matter may be implemented. Many modifications to the depicted environments may be made without departing from the spirit and scope of the present inventive subject matter.

With reference now to the figures, FIG. 1 depicts a pictorial representation of a network of data processing systems in which aspects of the present inventive subject matter may be implemented. Network data processing system 100 is a network of computers in which embodiments of the present inventive subject matter may be implemented. Network data processing system 100 contains network 102, which is the medium used to provide communication links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present inventive subject matter.

With reference now to FIG. 2, a block diagram of a data processing system is shown in which aspects of the present inventive subject matter may be implemented. Data processing system 200 is an example of a computer, such as server 104 or client 110 in FIG. 1, in which computer usable code or instructions implementing the processes for embodiments of the present inventive subject matter may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for embodiments of the present inventive subject matter are performed by processing unit 206 using computer usable program code, which may be located in a memory such as, for example, main memory 208, ROM 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present inventive subject matter may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more busses, such as bus 238 or bus 240 as shown in FIG. 2. Of course, the bus system may be implemented using any type of communication fabric or architecture that provides for a transfer of data between different components or devices attached to the fabric or architecture. A communication unit may include one or more devices used to transmit and receive data, such as modem 222 or LAN 212 of FIG. 2. A memory may be, for example, main memory 208, ROM 224, or a cache such as found in NB/MCH 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

Embodiments of the present inventive subject matter may be implemented using components of the network for the data processing system in FIG. 1, such as server 104 or storage 106. These embodiments may be implemented to serve the users of a network such as network 102 for the data processing system in FIG. 1, such as client 110, client 112, or client 114.

The aspects of present inventive subject matter provide a method, apparatus, and computer program product for blocking orders during order processing. Illustrative embodiments of the present inventive subject matter receive blocks for orders during order processing and stop the order processing of each blocked order at a stage of order processing that is based upon the reason for the corresponding order block. When the block for an order is resolved, order processing of the order restarts at a stage of order processing that is based upon the reason for the corresponding order block.

Figure 3:
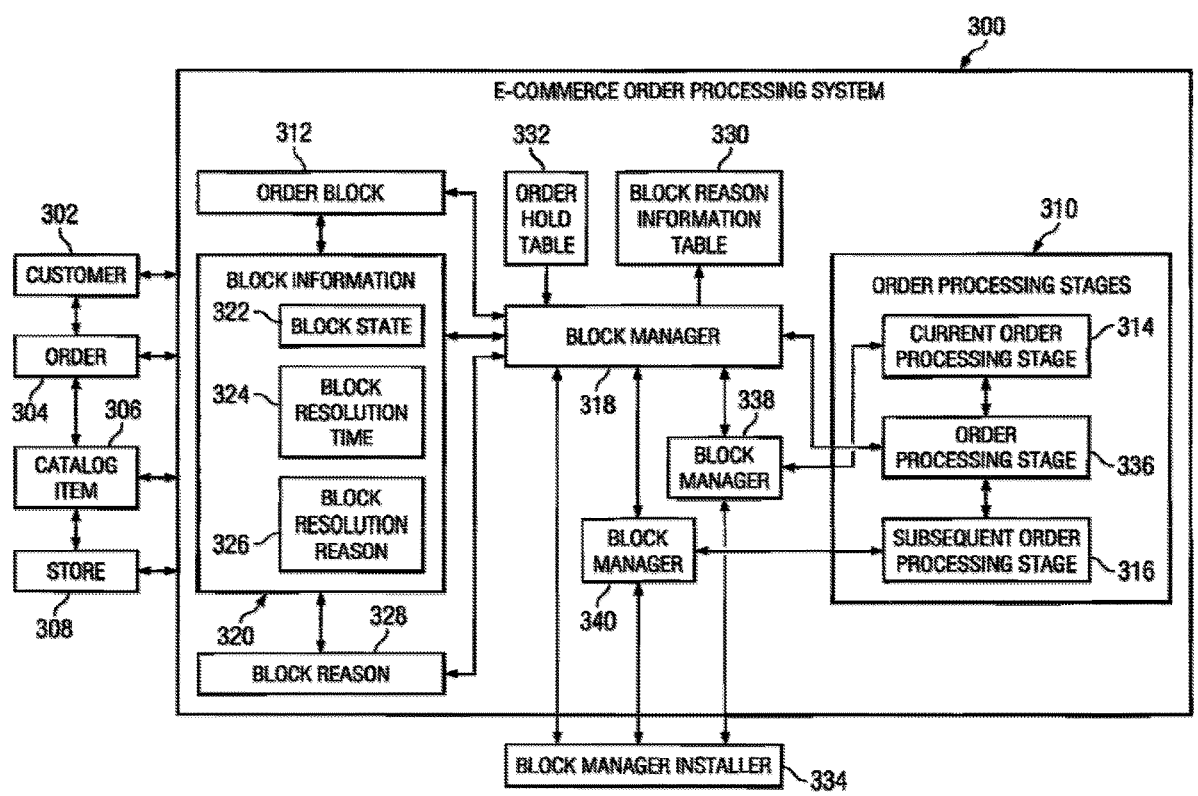
FIG. 3 is a block diagram illustrating examples of components that may be included in an e-commerce order processing system.

FIG. 3 is a block diagram illustrating examples of components that may be included in an e-commerce order processing system in accordance with an illustrative embodiment of the present inventive subject matter. E-commerce order processing system 300 may be implemented using a server, such as server 104 or server 106 in FIG. 1. Customer 302 uses e-commerce order processing system 300 to submit order 304 for catalog item 306. E-commerce order processing system 300 associates catalog item 306 and customer 302 with order 304. When e-commerce order processing system 300 associates catalog item 306 with order 304, e-commerce order processing system 300 makes a logical connection between catalog item 306 and order 304. Consequently, a reference to catalog item 306 logically connects to order 304 and a reference to order 304 logically connects to catalog item 306. E-commerce order processing system 300 determines that catalog item 306 associated with order 304 is located at store 308. Store 308 is a location where catalog items, such as catalog item 306, may be located. Therefore, e-commerce order processing system 300 associates order 304 with store 308 where catalog item 306 is located.

E-commerce order processing system 300 processes order 304 by executing order processing stages 310. Examples of order processing stages are described below, and may include, but are not limited to, an inventory allocation stage, a payment authorization stage, a send release to fulfillment stage, a picking and packing stage, a shipping stage, and a deposit payment stage.

When e-commerce order processing system 300 is executing any order processing stage in order processing stages 310, an order block, such as order block 312, may prevent e-commerce order processing system 300 from executing an order processing stage in order processing stages 310 for order 304. Each block for an order, such as order block 312, is associated with at least one order, such as order 304. Order block 312 may prevent e-commerce order processing system 300 from executing current order processing stage 314 for order 304 associated with order block 312. A current stage in the order processing of order 304 is a present phase for order 304 in e-commerce order processing system 300. In this illustrative example, the present phase is current order processing stage 314. Also, order block 312 may prevent e-commerce order processing system 300 from executing subsequent order processing stage 316 for order 304 associated with order block 312. Block 312 for order 304 is set based on internally or externally available data, internally or externally generated events, or internally or externally provided statuses. For example, customer 302, who is associated with order 304, may trigger the setting of order block 312 for order 304 due to a block reason associated with customer 302 or catalog item 306 associated with order 304. Alternatively, e-commerce order processing system 300 may set order block 312 for order 304 based on a status provided by store 308 that is associated with order 304.

A block manager, such as block manager 318, manages blocks for orders by creating and updating block information, such as block information 320, for each block for an order, such as order block 312 for order 304. Block manager 318 also associates block information 320 with both order block 312 and order 304 for which block information 320 is created. Block manager 318 is a component responsible for processing blocks for orders, block reasons, and block information associated with order blocks, orders, customers, stores, or catalog items. When block information 320 is associated with order 304, block information 320 is also indirectly associated with customer 302, store 308, and catalog item 306 with which order 304 is associated.

Block information 320 may include a number of attributes, such as block state 322, block resolution time 324, and block resolution reason 326. A seller may add additional attributes based on requirements of the seller. Block state 322 is the current condition of order block 312 for order 304. Block resolution time 324 is the time that order block 312 is resolved for order 304. Block resolution reason 326 is the reason why order block 312 is resolved for order 304. Examples of block state 322 for block information 320 include blocked and resolved. When block manager 318 creates block information 320, block manager 318 sets block state 322 of block information 320 to blocked.

Order 304 is blocked when block manager 318 associates block information 320 with order 304, store 308 associated with order 304, customer 302 associated with order 304, or catalog item 306 associated with order 304, and block state 322 of block information 320 is set to blocked. Block state 322 of blocked specifies that e-commerce order processing system 300 may not execute specific order processing stages, and may execute recovery actions, if specified. These specific order processing stages are specified in a block reason information table, which is discussed below. Either an automatically generated action or a manual action may resolve order block 312 for order 304. When actions resolve all blocks for order 304, block manager 318 sets block state 322 of block information 320 associated with order block 312 for order 304 to resolved.

An illustrative embodiment of the present inventive subject matter may have a single block manager, such as block manager 318, which is like an overseeing agent for all order processing stages. An illustrative embodiment may also have multiple block managers, such as block manager 318, wherein each block manager handles a single order processing state. In both cases, the functionality of the block manager, such as block manager 318, is the same. Block manager 318 also associates order block 312 for order 304 with a block reason, such as block reason 328. Examples of pre-defined block reasons are discussed below. In contrast to block information 320, which block manager 318 creates for order block 312 for order 304, a set of pre-defined block reasons exists before all orders are submitted and still exists after all orders are fulfilled. Block manager 318 associates at least one block reason from the set of block reasons with each block for order 304. When block manager 318 associates block reason 328 with order block 312, block manager 318 also indirectly associates block reason 328 with order 304 for which order block 312 is set. Therefore, block manager 318 also indirectly associates block reason 328 with customer 302, catalog item 306, and store 308 that is associated with order 304.

Each order is associated with a store, such that all block reasons associated with a store are associated with all orders associated with the store. For example, if a payment processing system associated with a store is temporarily unavailable, then a block manager creates a block for each order associated with the store. Each order is also associated with a customer, such that all block reasons associated with the customer are associated with all orders associated with the customer. For example, if a customer is listed in a denied parties list, then a block manager creates a block for each order associated with the customer. Additionally, each order is associated with one or more catalog items, such that all block reasons associated with a catalog item are associated with all orders associated with the catalog item. For example, a catalog item may have high fraud incidence, such as the purchase of a gift card. Consequently, a block manager creates an order block for each order associated with such a catalog item.

Block manager 318 may directly associate order block 312 with order 304, such as for fraud blocks, when there is a basis for believing that customer 302 fraudulently submitted order 304. Additionally, block manager 318 may indirectly associate order block 312 with order 304. For example, block manager 318 may need to block all orders associated with store 308 due to a technical issue with a back-end system, such as temporary unavailability of a payment processing or address verification system. The effect is the same whether block manager 318 directly or indirectly associates order block 312 with order 304.

Block manager 318 identifies block reason 328 associated with order block 312 to reference a block reason information table, such as block reason information table 330. Block reason information table 330 includes information for each specific block reason. Block reason information table 330 may specify a set of actions to execute when order 304 is blocked, held, or resolved for a specific block reason. A set of actions comprises one or more actions that may be executed when order 304 is blocked, held, or resolved. A set of actions may specify to execute specific order processing stages up to a set of specified order processing stages that cannot be executed for order 304 when order 304 is blocked for a specific block reason. A set of order processing stages that cannot be executed for order 304 when order 304 is blocked for a specific block reason may include one or more stages. For example, when order 304 is blocked while waiting to execute current order processing stage 314, block reason information table 330 may specify a set of actions that specify to execute specific order processing stages up to subsequent order processing stage 316. In another example, when order 304 is blocked while waiting to execute current order processing stage 314, block reason information table 330 may specify a set of actions that specify to hold order 304 by not executing current order processing stage 314.

The set of actions may also specify, for each block reason, a condition needed for order processing to restart. A condition needed for order processing to restart is the execution of the sequence of order processing stages, if any, which must be re-executed for order 304 that is blocked for a specific block reason when order block 312 for order 304 is resolved. For example, e-commerce order processing system 300 authorizes payment for order 304 before order 304 is blocked for block reason 328 while waiting to execute current order processing stage 314. After e-commerce order processing system 300 resolves order block 312 for order 304, e-commerce order processing system 300 needs to insure that payment authorization is still valid. Therefore, the set of actions specified in block reason information table 330 may specify to execute the previously executed stages once again that are required to authorize payment for order 304 before executing current order processing stage 314.

Furthermore, a set of actions may also specify, for each block reason, recovery actions to be executed if order block 312 associated with a particular block reason is set for order 304. For example, if order 304 is blocked while waiting to execute current order processing stage 314, a set of actions in block reason information table 330 may specify which recovery actions must be executed. A set of actions may specify to execute any recovery actions at the time when order block 312 is set or at the time when order block 312 is resolved.

Block manager 318 references block reason information table 330 using block reason 328 to determine a set of actions to execute to restart order processing if order block 312 associated with block reason 328 is resolved. The set of actions specifies execution of the correct order processing stages. When execution of order processing is at an order processing stage that cannot be executed because order 304 is blocked for a specific block reason, e-commerce order processing system 300 holds order 304. E-commerce order processing system 300 holds order 304 because block state 322 of the block information 320 associated with order 304 is blocked and block reason information table 330 specifies, for at least one of the block reasons associated with order 304, to not execute the next processing order stage for order 304. When e-commerce order processing system 300 holds order 304, block manager 318 creates, if necessary, and updates, if necessary, an order hold table, such as order hold table 332.

Block manager 318 references block reason information table 330 for each order that is held to record in order hold table 332 at which order processing stage each order restarts if all blocks associated with each order are resolved. An entry of order 304 in order hold table 332 indicates that the processing of order 304 is on hold due to at least one specified block reason. E-commerce order processing system 300 uses an entry in order hold table 332 to determine the correct order processing stage to restart order 304 when all blocks associated with order 304 are resolved. An example of order hold table 332 is found in Table I below:

TABLE I

| Order ID | Block Reason | Restart stage |
|----------|--------------|---------------|
| 999999 | Fraud | Authorize Payment |
| 999999 | Denied Party List | Authorize Payment |
| 999998 | Inventory cycle count | Allocate Inventory |

In order to implement an illustrative example of the present inventive subject matter, the seller prepares for the instrumentation of block managers. First, the seller executes a block manager installer, such as block manager installer 334, to create block reason information table 330 that is specific to the requirements of the seller. Block reason information table 330 includes a set of block reasons. Then seller executes block manager installer 334 to instrument a block manager, such as block manager 318, in the same programming language as the e-commerce order processing system, into each order processing stage in the e-commerce order processing system, such as order processing stage 336. In this illustrative example, block manager installer 334 also instruments block manager 338 and block manager 340 into current order processing stage 314 and subsequent order processing stage 316, respectively.

Figure 4:
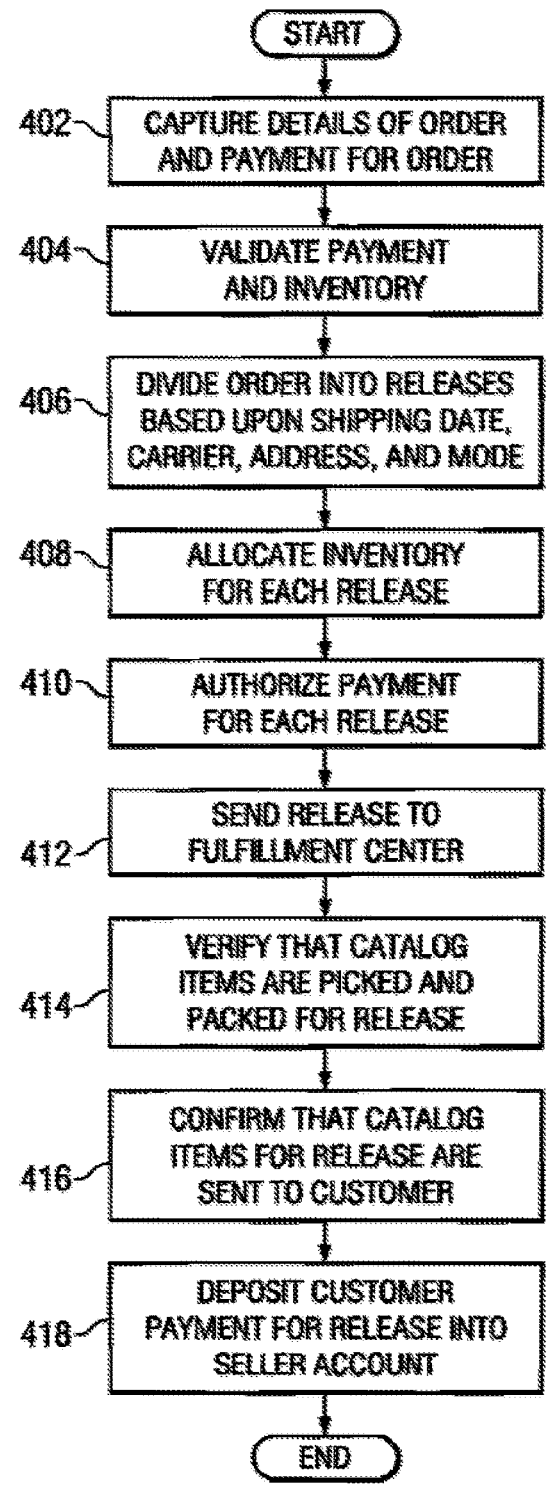
FIG. 4 is a block diagram illustrating examples of order processing stages that may be executed by an e-commerce order processing system.

E-commerce order processing system 300 includes a number of order processing stages. FIG. 4 is a block diagram illustrating examples of order processing stages, which may be executed by an e-commerce order processing system in accordance with an illustrative embodiment of the present inventive subject matter. An e-commerce order processing system, which may be the same as e-commerce order processing system 300 in FIG. 3, executes the order processing stages in FIG. 4, which may be the same as order processing stages 310, also in FIG. 3. The order processing stages executed, and the order of execution, may vary depending upon the specific application of the e-commerce order processing system. For each specific application of an e-commerce order processing system, the seller analyzes the order processing stages in the lifecycle of an order between the order being captured and the order being fulfilled. The order may be the same as order 304 in FIG. 3. The flow of an order through a given order processing stage to the next order processing stage is generally dependent on the successful completion of the previous order processing stage. Occasionally, the actions of a previous order processing stage may need to be executed again if all of the actions of a current order processing stage are not executed successfully. The current order processing stage may be the same as current order processing stage 314 in FIG. 3. This analysis enables an e-commerce order processing system to benefit from illustrative embodiments of the present inventive subject matter.

The set of order processing stages specified in FIG. 4 is an illustrative example from the result of such an analysis. The e-commerce order processing system captures details of an order and a payment for the order (step 402). Then the e-commerce order processing system validates payment and inventory (step 404). Next, the e-commerce order processing system divides the order into releases based on the shipping date, carrier, address, and mode (step 406). A release is a sub-division of an order. After that, the e-commerce order processing system allocates inventory for each release (step 408). Then the e-commerce order processing system authorizes payment for each release (step 410). Next, the e-commerce order processing system sends a release to a fulfillment center (step 412). After that, the e-commerce order processing system verifies that catalog items are picked and packed for the release (step 414). The catalog items may be the same as catalog item 306 in FIG. 3. Then the e-commerce order processing system confirms that the catalog items for the release are sent to the customer (step 416). The customer may be the same as customer 302 in FIG. 3. Next, the e-commerce order processing system deposits a customer payment for the release into a seller account (step 418).

Depending upon the situation, other order processing stages may be included. For example, an e-commerce order processing system may invoke an external application to verify whether a submitted shipping address is valid, to calculate a shipping cost, to request approval by a sales manager in case of dangerous goods, or, in case of back-orders, to execute a second payment authorization once goods are received in stock and allocated to an order.

The actual stages of an e-commerce order processing system may vary, but would generally include these stages listed as examples. Each seller may have a unique sequence of order processing stages, and an e-commerce order processing system executes the order processing stages in a sequence appropriate for the requirements of each seller. For example, while some sellers may obtain payment authorization before allocating inventory, other sellers may allocate inventory first, and then obtain payment authorization. In case of orders for digital goods, such as orders for downloading software, an e-commerce order processing system may not require the stages for inventory allocation, picking and packing, or shipping. The e-commerce order processing system may execute the stage for sending a release to a fulfillment center as a download of digital goods.

A number of block reasons exist for a block manager to block an order at any order processing stage. As an illustrative example, block reasons may be divided into four general categories, such as order block reasons, store block reasons, customer block reasons, and catalog item block reasons. The block manager directly associates an order block reason with an order, and indirectly associates a store block reason, a customer block reason, or a catalog item block reason with an order. The effect is the same whether a block reason is directly or indirectly associated with an order.

An order block reason is a block reason to block an individual order. Examples of order block reasons include fraud, payment rule violation, orders for large amounts, and excessive price override. An excessive price override is when a sales representative gives an excessive discount to a customer. A store block reason is a block reason to block any order associated with an individual store. Examples of store block reasons include when a payment gateway is down, when a store is overwhelmed with a large number of orders, when an inventory system is inaccurate, and when an inventory cycle count is in progress. A customer block reason is a block reason to block any order associated with an individual customer. Examples of customer block reasons include when a customer is on a denied party list, when a customer has been identified as submitting fraudulent orders, and when a customer has requested to block all orders. A catalog item block reason is a block reason to block any order associated with a catalog item. Examples of catalog item block reasons include when a catalog item is not yet available, when a catalog item has been discontinued, and when a catalog item is sensitive enough for the sale of that catalog item to require special approval. Each seller may define their own additional block reasons for order blocks, or even define their own additional categories of block reasons for order blocks.

In traditional e-commerce order processing systems, blocking an order is typically implemented as a simple flag on an order that is used to stop the processing of that order. In such systems, the order processing stops either instantaneously, or stops at a pre-defined stage. In contrast, illustrative embodiments of the present inventive subject matter use a set of action specified in a block reason information table to specify which order processing stages may be executed for an order and which order processing stage may not be executed for the order. The sequentially first order processing stage that may not be executed for an order is the order processing stage where the order is held. In general, a seller is interested in executing as many order processing stages for each order as quickly as possible in order to avoid bottlenecks in an e-commerce order processing system. Illustrative embodiments of the present inventive subject matter block orders in an e-commerce order processing system in a manner that the number of order processing stages executed for each order is maximized for orders that are blocked.

A block reason information table specifies, for a particular block reason, the set of actions, which specifies which order processing stages may be executed. The set of actions may specify the order processing stage where an order is held, the order processing stages to be re-executed if the associated order block is resolved, and any recovery actions to take. FIG. 5 is an example of a block reason information table, such as block reason information 330 in FIG. 3, which specifies sets of actions in accordance with an illustrative embodiment of the present inventive subject matter. FIG. 5 illustrates examples of sets of actions for specific block reasons, including may not execute 502, the order processing stages that are not executed when an order is blocked, re-execute 504, a set of order processing stages that are re-executed when an order block is resolved, and recovery actions 506, recovery actions that are executed. The order may be the same as order 304, and the order block may be the same as order block 312, both in FIG. 3. The set of actions that are executed when an order block is set for an order may be based on a combination of the set of actions specified by may not execute 502 and the set of actions specified by recovery actions 506. Recovery actions 506 may be executed when an order block is set, when an order is held, or when an order block is resolved. The set of actions specified by re-execute 504 are executed when an order block is resolved.

As an illustrative example of the set of actions specified in FIG. 5, when block reason 500 is fraud 508, a block reason information table specifies a set of actions to execute. The set of actions specifies to execute all order processing stages up to the specific order processing stages that are not to be executed. The specific order processing stages that are not executed when an order is blocked for fraud 508 are authorize payment 510, allocate inventory 512, and send release to fulfillment 514. In another illustrative example, when block reason 500 is denied party list 516 and an order block is resolved, the set of actions specifies to re-execute the order processing stage of authorize payment 518. In yet another illustrative example, when block reason 500 is inventory cycle count 520, the set of actions specifies to execute a recovery action that is de-allocate inventory 522. The sets of actions in a block reason information table may be implemented as an XML file.

A set of actions may specify that execution of the current order processing stage is to be completed. The current order processing stage may be the same as current order processing stage 314 in FIG. 3. For example, the order processing stage for divide order, which may be the same as divide order 406 in FIG. 4, is executing for an order when an order block for fraud 508 is set for the order. May not execute 502 specifies that the set of order processing stages that may not be executed for fraud 508 are specific order processing stages in the sequence following the order processing stage for divide order. The specified recovery action is none 524. Therefore, the combination of the sets of actions specifies that the execution of the current order processing stage, divide order, is to be completed.

The set of actions may specify that execution of the current order processing stage is stopped and the current status of an order reversed to the previous status of the order that existed prior to execution of the current order processing stage. A current status of an order is the collective conditions that presently exist for an order. A previous status of an order is the collective conditions that formerly existed for an order.

A current status of an order reverses to a previous status of the order when the collective conditions that presently exist for an order change to the collective conditions that formerly existed for the order. For example, the order processing stage for allocate inventory, which may be the same as allocate inventory 408 in FIG. 4, is executing for an order when an order block for inventory cycle count 520 is set for the order. May not execute 502 specifies that the set of order processing stages that may not be executed for inventory cycle count 520 includes the current order processing stage, allocate order. The specified recovery action is de-allocate inventory 522. Therefore, the combination of the sets of actions specifies that the execution of the current order processing stage, allocate inventory, is stopped. The combination of the sets of actions also specifies that de-allocate inventory 522 is executed. The execution of de-allocate inventory 522 reverses the current status of the order to the previous status of the order that existed prior to execution of the current order processing stage, allocate inventory.

Other sets of actions may specify that the current order processing stage is stopped at whatever point the current order processing stage is executing and that no attempt is made to reverse the current status of an order to the previous status of the order that existed prior to execution of the current order processing stage. For example, the order processing stage for allocate inventory is executing for an order when an order block for denied party list 516 is set for the order. May not execute 502 specifies that the set of order processing stages that may not be executed for denied party list 516 includes the current order processing stage, allocate inventory. However, the specified recovery action is none 526, and not de-allocate inventory. Therefore, the combination of the sets of actions specifies that the execution of the current order processing stage, allocate inventory, is stopped at whatever point allocate inventory is executing. The combination of the sets of actions also specifies that no attempt is made to reverse the current status of the order to the previous status of the order that existed prior to execution of the current order processing stage, allocate inventory. After executing this set of actions, when the e-commerce order processing system resolves the order block for denied party list 516 for the order, the execution of allocate inventory for the order continues at the point where the execution previously stopped for the order.

If an order is blocked for multiple block reasons, a block manager makes multiple determinations for the e-commerce order processing system. The block manager may be the same as block manager 318 in FIG. 3. The recovery actions that the e-commerce order processing system executes are all of the recovery actions specified by the sets of actions for all of the associated block reasons. The e-commerce order processing system may be the same as e-commerce order processing system 300 in FIG. 3. The stages that the e-commerce order processing system re-executes are all of the re-executable stages specified by the sets of actions for all of the associated block reasons. However, the specified order processing stages are executed or re-executed only if specified by the sets of actions for all of the associated block reasons. If the set of actions of at least one block reason associated with an order does not specify the execution of an order processing stage, that order processing stage is not executed for that order.

Figure 6:
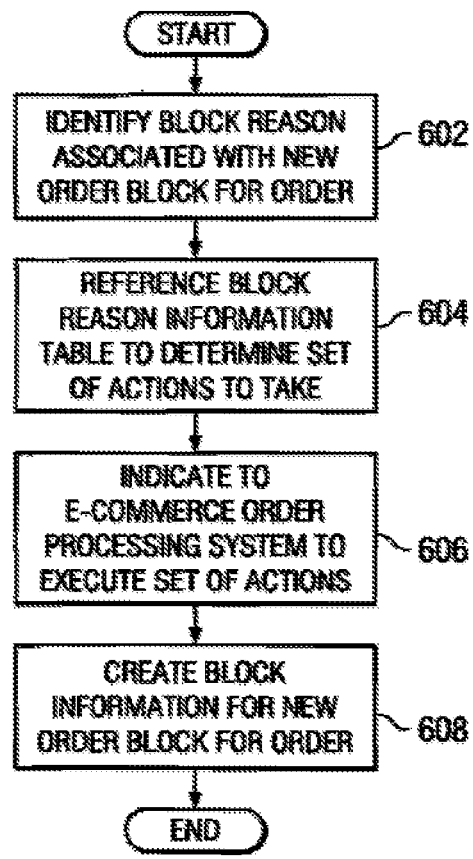
FIG. 6 is an example of a process in which a block manager identifies a new block for an order.

Before a block manager references a block reason information table for an order, a block manager creates block information for a new order block for the order. FIG. 6 is an example of a process for when a block manager identifies a new order block for an order in accordance with an illustrative embodiment of the present inventive subject matter. The process is implemented in a block manager such as block manager 318 in FIG. 3. The order may be the same as order 304, and the order block may be the same as order block 312, both in FIG. 3. At each order processing stage, a block manager manages each order at the order processing stage. The block manager manages each order block for each order at the order processing stage and each resolve of an order block for each order at the order processing stage. When a block manager identifies a new order block for an order, the block manager identifies a block reason associated with the new order block for the order (step 602). The block reason may be the same as block reason 328 in FIG. 3. Using the block reason associated with the new order block for the order, the block manager references the block reason information table to determine a set of actions to take (step 604). The set of actions may specify to complete execution of the current order processing stage or to stop execution of the current order processing stage. The current order processing stage may be the same as current order processing stage 314 in FIG. 3. The set of actions may specify to reverse the current status of the order to the previous status of the order that existed prior to execution of the current order processing stage. Based on the determination of the set of actions to take, the block manager indicates to the e-commerce order processing system to execute the set of actions (step 606). The block manager indicates execution when the block manager indicates to the e-commerce order processing system to execute the set of actions. The e-commerce order processing system may be the same as e-commerce order processing system 300 in FIG. 3. Alternatively, the block manager may invoke the set of actions. As another possibility, a scheduled batch job may execute the set of actions. Then the block manager creates block information for the new order block for the order (step 608). The block information may be the same as block information 320 in FIG. 3.

Figure 7A:
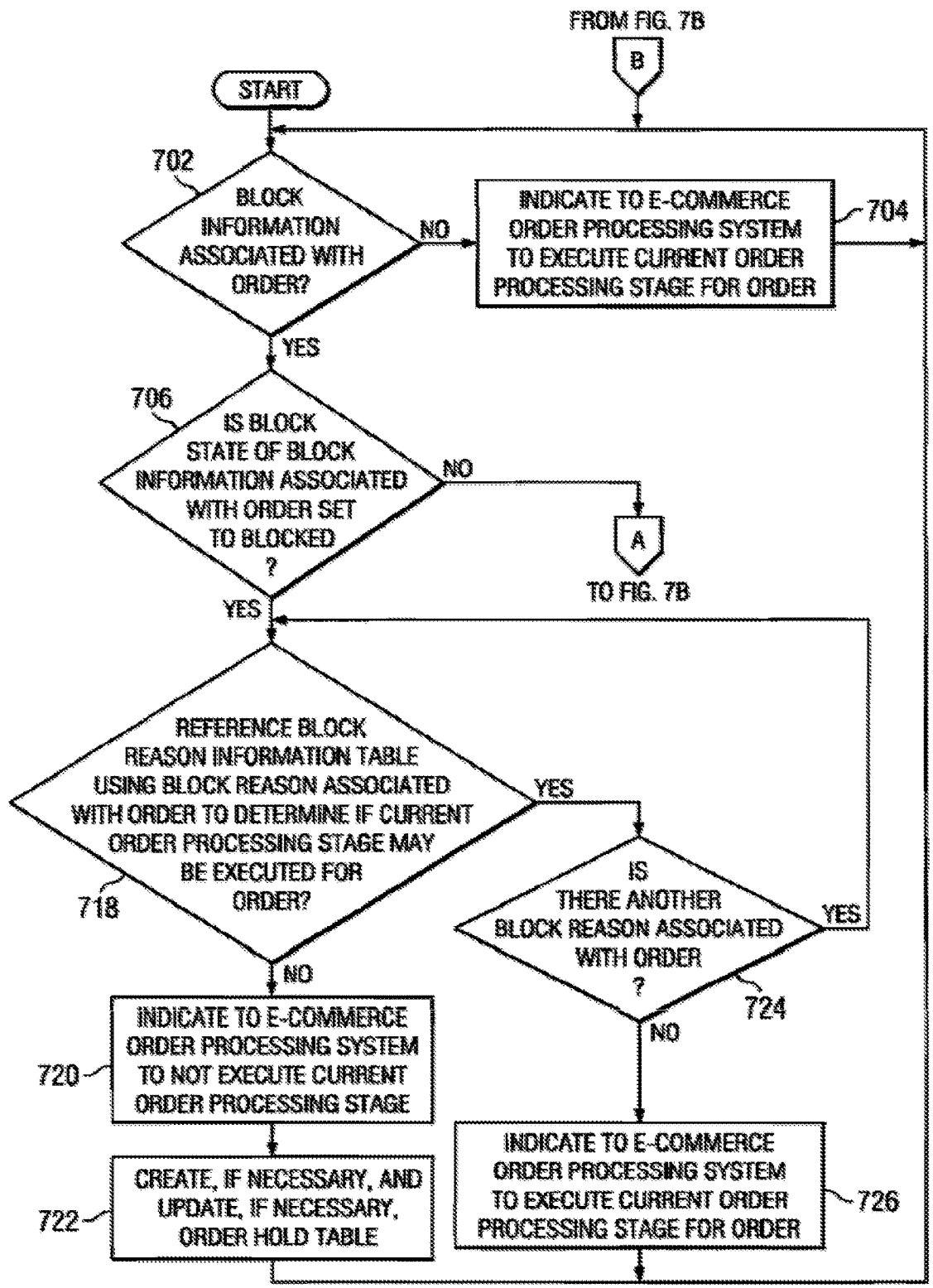
FIGS. 7A and 7B is an example of a process for a block manager before an e-commerce order processing system executes a current order processing stage for an order.
Figure 7B:
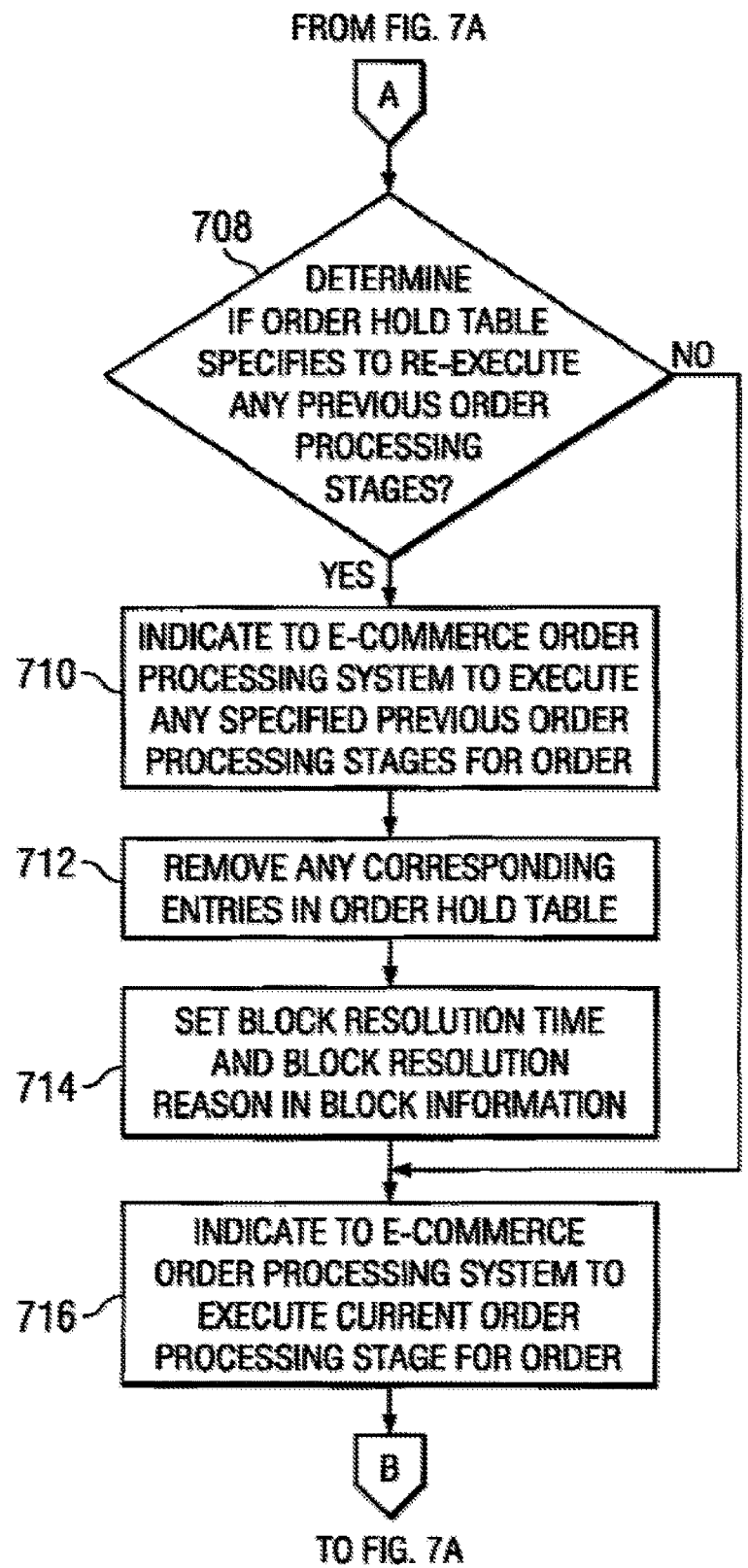

After a block manager detects a new order block for an order, an e-commerce order processing system uses a block manager to evaluate each order before executing a current order processing stage for each order. FIGS. 7A and 7B are an example of a process for a block manager before an e-commerce order processing system executes a current order processing stage for an order in accordance with an illustrative embodiment of the present inventive subject matter. The e-commerce order processing system may be the same as e-commerce order processing system 300, the order may be the same as order 304, the current order processing stage may be the same as current order processing stage 314, and the block manager may be the same as block manager 318, all in FIG. 3. Before executing a current order processing stage for an order, the e-commerce order processing system uses the block manager to manage block information associated with the order. The block information may be the same as block information 320 in FIG. 3. The block manager determines if block information is associated with an order (step 702). If the block manager determines that block information is not associated with an order, the block manager indicates to the e-commerce order processing system to execute the current order processing stage for the order (step 704). Because all blocked orders are associated with block information, if an order is not associated with block information, then the order is not blocked, such that the current order processing stage may be executed for the order. If the block manager indicates to the e-commerce order processing system to execute the current order processing stage for the order, the block manager returns to step 702 to evaluate the next order for the current order processing stage.

If the block manager determines that block information is associated with an order, the block manager determines if the block state of the block information associated with the order is set to blocked (step 706). The block state may be the same as block state 322 in FIG. 3. When a block manager created the block information, the block manager set the block state of the block information to blocked. However, before the e-commerce order processing system executes the current order processing stage, an authorized administrator may set the block state of the block information to resolved. If the block manager determines that the block state of the block information associated with the order is no longer set to blocked, the block manager determines if the order hold table specifies to re-execute any previous order processing stages (step 708). The order hold table may be the same as order hold table 332 in FIG. 3. If an order is associated with block information, and the block state of the block information associated with the order is currently set to resolved, the order may have been blocked or held previously. If the block manager determines that the order hold table specifies to re-execute any previous order processing stages, the block manager indicates to the e-commerce order processing system to re-execute any specified previous order processing stages for the order (step 710).

If the block manager indicates to the e-commerce order processing system to re-execute any specified previous order processing stages for the order, the block manager removes any corresponding entries in the order hold table (step 712). By removing any corresponding entries in the order hold table, the block manager ensures that execution of subsequent order processing stages will not repeatedly re-execute any previous order processing stages based on the order block that is resolved. The order block may be the same as order block 312 in FIG. 3. If the block manager removes any corresponding entries in the order hold table, the block manager sets the block resolution time and the block resolution reason in the block information (step 714). The block resolution time may be the same as block resolution time 324, and the block resolution reason may be the same as block resolution reason 326, both in FIG. 3. After an order is no longer held, the block manager records the block resolution time and the block resolution reason in the block information. If the block manager sets the block resolution time and the block resolution reason in the block information, the block manager indicates to the e-commerce order processing system to execute the current order processing stage for the order (step 716). After any previous order processing stages specified by the order hold table are re-executed and the order hold table is cleared, the current order processing stage for the order is executed. If the block manager determines that the order hold table does not specify to re-execute any previous order processing stages, the block manager indicates to the e-commerce order processing system to execute the current order processing stage for the order (step 716). If the order is not associated with an entry in the order hold table, the order is not being held, such that the current order processing stage may be executed for the order. If the block manager indicates to the e-commerce order processing system to execute the current order processing stage for the order, the block manager returns to step 702 to evaluate the next order for the current order processing stage, completing the steps executed when a block state of the block information is set to resolved.

If the block manager determines that the block state of the block information associated with the order is set to blocked, the block manager references the block reason information table using the block reason associated with the order to determine if the current order processing stage may be executed for the order (step 718). The block reason may be the same as block reason 328 in FIG. 3. When the block state of the block information is set to blocked, the block manager determines if the current order processing stage may be executed for the order. If the block reason information table specifies that the current order processing stage may not be executed for the order, the block manager indicates to the e-commerce order processing system to not execute the current order processing stage (step 720). If the block manager indicates to the e-commerce order processing system to not execute the current order processing stage, then the block manager creates, if necessary, and updates, if necessary, an order hold table (step 722). When an order processing stage may not be executed for an order, the order is held at that order processing stage. If an order hold table does not already exist, the block manager creates the order hold table. The block manager may not need to update the order hold table with an entry for the order if the block manager previously updated the order hold table with an entry for the order during a previous attempt to execute the current order processing stage. If the block manager determines whether to create or update an order hold table, the block manager returns to step 702 to evaluate the next order for the current order processing stage.

If the block reason information table specifies that the current order processing stage may be executed for the order, the block manager determines if there is another block reason associated with the order (step 724). Even if the block reason evaluated specifies that the current order processing stage may be executed for the order, the order may be associated with another block reason that specifies that the current order processing stage may not be executed for the order. If there is another block reason associated with the order, the block manager returns to step 718 to reference a block reason information table using the other block reason to determine if the current order processing stage may be executed for the order. If there is not another block reason associated with the order, the block manager indicates to the e-commerce order processing system to execute the current order processing stage for the order (step 726). If the block manager indicates to the e-commerce order processing system to execute the current order processing stage for the order, the block manager returns to step 702 to evaluate the next order for the current order processing stage, completing the steps executed when a block state of the block information is set to blocked.

Figure 8:
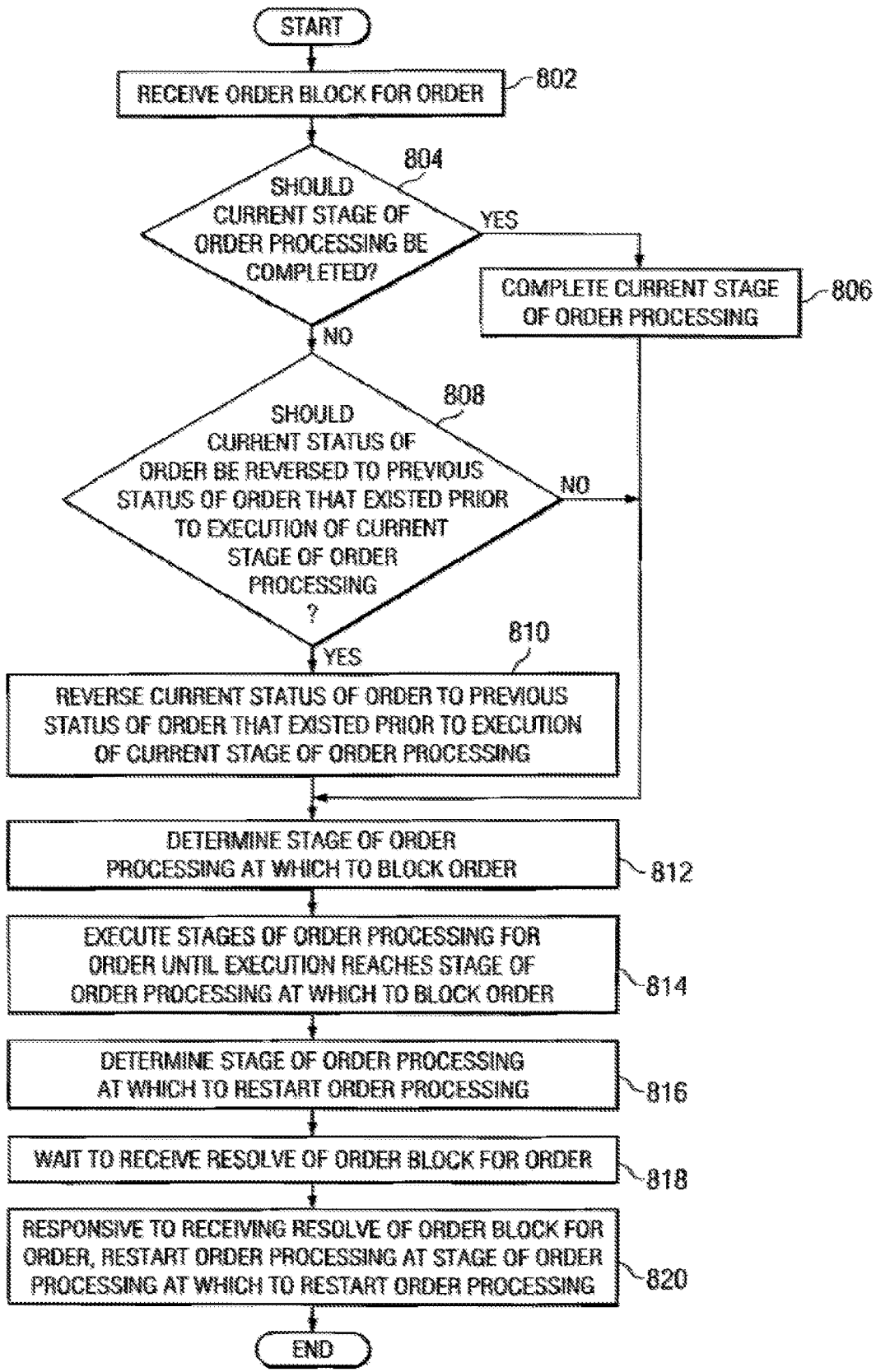
FIG. 8 is an example of a process for an e-commerce order processing system.

The process for an e-commerce order processing system that uses a block manager has some similarities to the process just described for the block manager, but on a higher level. FIG. 8 is an example of process for an e-commerce order processing system in accordance with an illustrative embodiment of the present inventive subject matter. The e-commerce order processing system may be e-commerce order processing system 300 in FIG. 3. The e-commerce order processing system receives an order block for an order (step 802). The order may be the same as order 304, and the order block may be the same as order block 312, both in FIG. 3. Next, by using a block reason associated with the order and a block reason information table, the e-commerce order processing system determines whether a current stage of order processing should be completed (step 804). The block reason may be the same as block reason 328 in FIG. 3. If the e-commerce order processing system determines a current stage of order processing should be completed, the e-commerce order processing system completes the current stage of order processing (step 806). If the e-commerce order processing system determines a current stage of order processing should not be completed, the e-commerce order processing system determines if a current status of the order should be reversed to a previous status of the order that existed prior to execution of the current stage of order processing (step 808). If the e-commerce order processing system determines that a current status of the order should be reversed to a previous status of the order that existed prior to execution of the current stage of order processing, the e-commerce order processing system reverses a current status of the order to a previous status of the order that existed prior to execution of the current stage of order processing (step 810).

Next, the e-commerce order processing system determines a stage of order processing at which to block the order (step 812). Then the e-commerce order processing system executes stages of order processing for the order until execution reaches the stage of order processing at which to block the order (step 814). After that, the e-commerce order processing system determines a stage of order processing at which to restart the order processing (step 816). Subsequently, the e-commerce order processing system waits to receive a resolve of the order block for the order (step 818). Responsive to the e-commerce order processing system receiving a resolve of the order block for the order, the e-commerce order processing system restarts the order processing at the stage of order processing at which to restart the order processing (step 820).

An e-commerce order processing system may use the process illustrated in FIG. 8 to enable finer grained control of order blocks and enable the execution of a specified amount of order processing based upon the reason for an order block, in contrast to treating all order blocks in an identical manner. Illustrative embodiments of the present inventive subject matter may therefore be used to prevent bottlenecks at inappropriate stages in order processing, permit higher throughput, and enhance the capability to manage a blocked order without manual intervention. Illustrative embodiments of the present inventive subject matter enable the implementation of an order processing system wherein the order block, restart and recovery actions are configurable based on the requirements of a seller.

The description of the embodiments of the present inventive subject matter has been presented for purposes of illustration and description, and is not intended to be exhaustive or limited to the inventive subject matter in the form disclosed. Many modifications and variations will be apparent to those of ordinary skill in the art. The embodiment was chosen and described in order to best explain the principles of the inventive subject matter, the practical application, and to enable others of ordinary skill in the art to understand the inventive subject matter for various embodiments with various modifications as are suited to the particular use contemplated.

What is claimed is:

1. A method for blocking orders during order processing by a computerized system, the computerized system including at least one electronic processing unit, the method comprising:
   initiating, by the at least one electronic processing unit, processing of an order, the processing including a plurality of sequential stages;
   detecting, via an electronic communication interface of the computerized system, at a first order-processing stage of the plurality of sequential stages, a block for the order during processing of the order;
   determining, via the at least one electronic processing unit and in response to electronically analyzing the block for the order, a reason for the block for the order;
   creating a first table in a memory of the computerized system, the first table including the reason for the block for the order;
   accessing, via the at least one electronic processing unit, a second table in the memory of the computerized system, the second table indicating a plurality of reasons for blocking the order and a plurality of actions,
      wherein the second table specifies a set of one or more actions of the plurality of actions to take for each of the plurality of reasons for blocking the order,
      wherein the plurality of reasons for blocking the order comprises the reason for the block for the order;
   selecting, via the at least one electronic processing unit, the set of one or more actions specified by the second table for the reason for the block for the order;
   automatically performing, via the at least one electronic processing unit, at least one subsequent order-processing stage of a number of subsequent stages performed after determining the reason for the block for the order, the number of subsequent stages performed being specified by the set of one or more actions;
   automatically ceasing processing for the order after performing the at least one subsequent order-processing stage as specified by at least one action from the set of one or more actions;
   in response to a determination that at least one action from the set of one or more actions specifies that a current status of the order should be reversed, reversing, via the at least one electronic processing unit, the current status of the order to a previous status of the order that existed prior to execution of the first order-processing stage of the plurality of stages when the block was received; and
   in response to determining the block is resolved, resuming processing for the order after the block is resolved.

2. The method of claim 1, wherein the set of one or more actions indicates a condition for said resuming the processing of the order after the block is resolved and wherein the set of one or more actions indicate that subsequent order-processing stages cannot be executed while the block is unresolved.

3. A computerized apparatus for blocking orders during order processing, the computerized apparatus comprising:
   a bus;
   at least one electronic processing unit coupled with the bus;
   an electronic communication interface;
   a storage device coupled with the bus, the storage device configured to store program instructions executable by the at least one electronic processing unit, the program instructions configured to:
      initiate, by the at least one electronic processing unit, processing of an order, the processing including a plurality of sequential stages;
      detect, via the electronic communication interface, at a first order-processing stage of the plurality of sequential stages, a block for the order during processing of the order;
      determine, via the at least one electronic processing unit and in response to electronically analyzing the block for the order, a reason for the block for the order;
      create a first table in a memory of the computerized system, the first table including the reason for the block for the order;
      access, via the at least one electronic processing unit, a second table in the memory of the computerized apparatus, the second table indicating a plurality of reasons for blocking the order and a plurality of actions,
         wherein the second table specifies a set of one or more actions of the plurality of actions to take for each of the plurality of reasons for blocking the order,
         wherein the plurality of reasons for blocking the order comprises the reason for the block for the order;
      select, via the at least one electronic processing unit, the set of one or more actions specified by the second table for the reason for the block for the order;
      automatically perform, via the at least one electronic processing unit, at least one subsequent order-processing stage of a number of subsequent stages performed after determining the reason for the block for the order, the number of subsequent stages performed being specified by the set of one or more actions;
      automatically cease processing for the order after performing the at least one subsequent order-processing stage as specified by at least one action from the set of one or more actions;
      in response to a determination that at least one action from the set of one or more actions specifies that a current status of the order should be reversed, reverse the current status of the order to a previous status of the order that existed prior to execution of the first order-processing stage of the plurality of stages when the block was received; and
      in response to a determination that the block is resolved, resume processing of the order after the block is resolved.

4. The computerized apparatus of claim 3, wherein the set of one or more actions indicates a condition for the processing of the order to be resumed after the block is resolved and wherein the set of one or more actions indicates that subsequent order-processing stages cannot be executed while the block is unresolved.

5. A computer program product comprising:
   a non-transitory computer usable storage medium having computer usable program code embodied therein, the computer usable program code configured to:
      initiate, by at least one electronic processing unit of a computerized system, processing of an order, the processing including a plurality of sequential stages;
      detect, via an electronic communication interface of the computerized system, at a first order-processing stage of the plurality of sequential stages, a block for the order during processing of the order;

determine, by the at least one electronic processing unit, in response to electronically analyzing the block for the order, a reason for the block for the order;

create a first table that includes the reason for the block for the order;

access, by the at least one electronic processing unit, a second table that indicates a plurality of reasons for blocking the order and a plurality of actions, wherein the second table specifies a set of one or more actions of the plurality of actions to take for each of the plurality of reasons for blocking the order, wherein the plurality of reasons for blocking the order comprises the reason for the block for the order;

select the set of one or more actions specified by the second table for the reason for the block for the order;

automatically perform, by the at least one electronic processing unit, at least one subsequent order-processing stage of a number of subsequent stages performed after determining the reason for the block for the order, the number of subsequent stages performed being specified by the set of one or more actions;

automatically cease processing for the order after performing the at least one subsequent order-processing stage specified by at least one action from the set of one or more actions; and in response to a determination that at least one action from the set of one or more actions specifies that a current status of the order should be reversed, reverse the current status of the order to a previous status of the order that existed prior to execution of the first order-processing stage of the plurality of stages when the block was received; and in response to a determination that the block is resolved, resume processing of the order after the block is resolved.

6. The computer program product of claim 5, wherein the set of one or more actions indicates a condition for the processing of the order to be resumed after the block is resolved and wherein the set of one or more actions indicates that subsequent order-processing stages cannot be executed while the block is unresolved.

7. The method of claim 1 further comprising electronically analyzing the block for the order in response to the detecting the block for the order.

8. The method of claim 7 further comprising:
determining an identity of a seller associated with the order in response to the electronically analyzing the block for the order; and automatically determining, by the at least one electronic processing unit, based on the identity of the seller, one or more of the set of one or more actions from a plurality of sets of actions, the reason for the block, or the plurality of sequential stages.

9. The computerized apparatus of claim 3, the storage device configured to store program instructions executable by the at least one electronic processing unit to electronically analyze the block for the order in response to detection of the block for the order.

10. The computerized apparatus of claim 9, the storage device configured to store program instructions executable by the at least one electronic processing unit to:
determine an identity of a seller associated with the order in response to the electronically analyzing the block for the order; and automatically determine, by the at least one electronic processing unit, based on the identity of the seller, one or more of the set of one or more actions from a plurality of sets of actions, the reason for the block, or the plurality of sequential stages.

11. The computer program product of claim 5, the non-transitory computer usable storage medium having computer usable program code embodied therein to electronically analyze the block for the order in response to detection of the block for the order.

12. The computer program product of claim 11, the non-transitory computer usable storage medium having computer usable program code embodied therein to:
determine an identity of a seller associated with the order in response to the electronically analyzing the block for the order; and automatically determine, by the at least one electronic processing unit, based on the identity of the seller, one or more of the set of one or more actions from a plurality of sets of actions, the reason for the block, or the plurality of sequential stages.

* * * * *